Nov. 4, 1930.                F. RIEBER                1,780,567
              METHOD AND APPARATUS FOR RECORDING EXPLOSIVE SHOCKS
                          Filed June 7, 1927
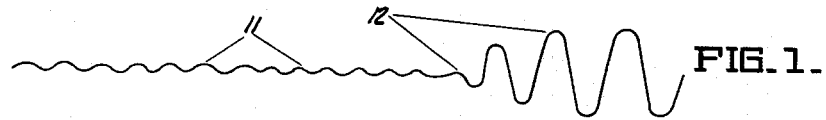
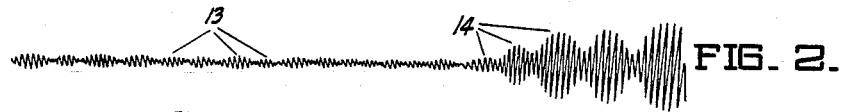
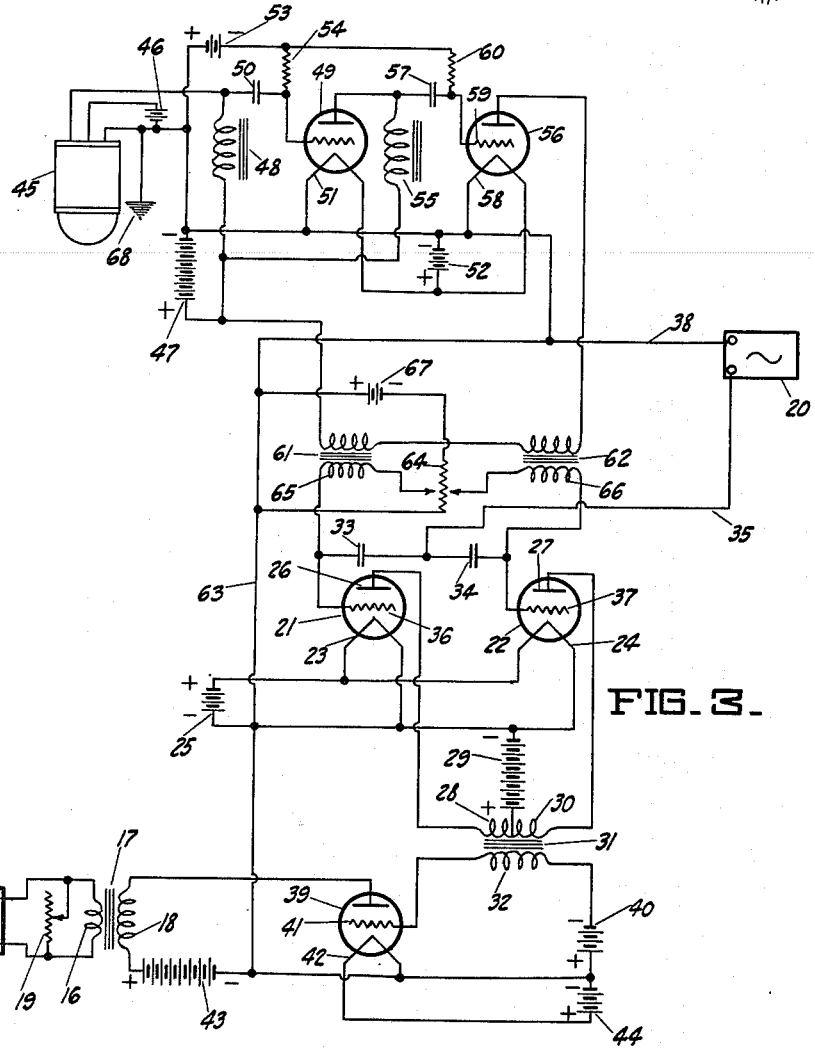
INVENTOR
Frank Rieber
BY
His Attorney Patented Nov. 4, 1930

1,780,567

UNITED STATES PATENT OFFICE

FRANK RIEBER, OF SAN FRANCISCO, CALIFORNIA

METHOD AND APPARATUS FOR RECORDING EXPLOSIVE SHOCKS

Application filed June 7, 1927. Serial No. 197,212.

This invention relates to the measurement of time intervals, and especially for indicating the time of arrival of shocks transmitted through the earth.

The determination of such intervals is especially useful for purposes of geophysical explorations; and also in connection with the location of cannon or batteries, For geophysical exploration, such data are utilized for making it possible to plot time-travel curves, which show the times consumed for the shocks to travel to points at differing distances from the locality of the explosion. From these curves, certain information can be deduced in well-known ways, as regards the strata beneath the earth's surface.

When earth shocks are transmitted in the form of mechanical waves, it is observed that at a point spaced from the transmission point, there is a series of trains of waves which persists for a period, each train representing shocks transmitted along a distinct path. However, for exploration purposes, the time of first arrival is the only one of importance. It is one of the objects of my invention to make it possible to measure the time of first arrival of these waves with great accuracy.

It is another object of my invention to make it possible easily to determine the time of arrival of even small shocks.

It is still another object of my invention to exhibit clearly the relative magnitude of records produced by small shocks of only slightly different intensities.

In the past, it has been common to utilize seismographs to record the shocks. Such apparatus is primarily designed for reproducing the actual motion of the earth. For this purpose, it usually includes a large mass the inertia of which causes it to remain relatively stationary when the earth moves in response to a shock, in connection with mechanical magnification and a recording device for indicating the relative motion of the earth with respect to the mass. Such apparatus is not only very inaccurate for the determination of the exact instant of arrival of the first shock, but it is also much less sensitive than apparatus constructed in accordance with my invention. Accordingly it is still another object of my invention to provide an accurate and sensitive recorder for the time of first arrival of such earth transmitted shocks.

I provide an electrical system for effecting these highly beneficial results. In this system there is included preferably a galvanometer type of recorder; and in accordance with my invention, the recorder traces not merely a series of curves showing directly the intensities of the shocks, but rather a series of closely spaced alternations, the envelope of which exhibits areas corresponding in extent to the intensities recorded. I have found that such a scheme makes the record much more capable of interpretation. It is easy to pick out that point on the record corresponding to the first arrival.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings:

Figure 1 is a reproduction of a true record of earth shocks, and is included merely to illustrate the advantages of the present invention;

Fig. 2 is a reproduction of a record made by the aid of my invention, and corresponding to the conditions indicated by the record of Fig. 1; and Fig. 3 is a wiring diagram illustrating one form of a system that embodies my invention.

In Fig. 1, there is shown an ideal record of mechanical earth shocks received at a station. The irregular, small undulations 11 represent the normal trembling of the earth due to various and undetermined causes. The larger waves 12 represent vibrations caused by an explosion. It will be seen that it is somewhat difficult to find, in such a record, the exact point when the recorded oscillations increase in amplitude. Nor is it easy to distinguish the exact relative magnitude of two waves that are not adjacent on the record.

With the aid of my invention, these difficulties are overcome. This can be demonstrated by the aid of Fig. 2, showing a record made by my apparatus and corresponding to the conditions shown in Fig. 1. In this form of record, there are present a series of closely spaced oscillations or alternations, the amplitudes of which vary in accordance with the received shocks. In other words, high frequency oscillations serve to modulate the received earth shocks; and if there are none, then the high frequency oscillations also disappear. These oscillations can be of about the frequency of 1000 cycles. The small amplitude groups 13 of modulated high frequency correspond to the unavoidable trembling of the earth. The large amplitude groups 14 represent the effect of an abruptly arriving pressure wave.

In this record, it is noted that the effect on the eye is one of area covered rather than amplitude of deflection. A slightly larger area impresses the eye very much more readily than would the slightly larger amplitude of the original wave necessary to produce the record. Also, by careful inspection of the record, it is possible to tell exactly when the shock begins to be felt by the apparatus. Thus all that is necessary is to note the first of the 1000 cycle oscillations in the record which exceeds in amplitude the one preceding it. Such precision would be very difficult with the record of Fig. 1.

Referring now to the apparatus by the aid of which these desirable results can be obtained, attention is called to Fig. 3. The recorder 15 shown diagrammatically, is used for producing the record of Fig. 2. It can be an oscillograph of the usual form; but I prefer to use a tuned string galvanometer, whereby the resonance of the string can be adjusted to the frequency of the first wave train through the earth. In this way it can be made relatively insensitive to the succeeding trains, which are usually lower in frequency. This recorder is shown in this instance as energized from the secondary 16 of a step-down transformer 17, having a primary 18. For controlling the amplitude of the signals, a variable shunt resistance 19 can be provided.

The arrangement is such that when no vibrations are received, the recorder 15 is inactive, even when the local oscillator 20 is in operation to provide the high frequency oscillations that modulate the incoming waves. This oscillator is connected to the input circuits of two thermionic amplifiers 21 and 22. These amplifiers are of the well-known audion type, having each an evacuated envelope in which filaments 23 and 24 emit electrons when heated by current from source 25. The space current set up by the electrons is conducted to the anodes 26 and 27, which are kept at potentials positive with respect to their filaments. The external or output circuit connecting the filament and plate of audion 21, forms a path for the space current, and includes coil 28 of a transformer, "B" battery 29 for maintaining the plate 26 positive; and filament 23. The output circuit for audion 22 includes coil 30, battery 29 and filament 24. Coils 28 and 30 are preferably wound on a common core 31 and are opposed, so that if oscillator 20 equally affects amplifiers 21 and 22, and no other influences are brought to bear, then no E. M. F. is induced in coil 32 coupled to coils 28 and 30.

Oscillator 20 is so arranged that this balance is maintained unless shocks are received. For this purpose, it connects, through stopping condensers 33 and 34, and lead 35, to the control electrodes 36 and 37 of these amplifiers. The other terminal of oscillator 20 connects as by lead 38 with both filaments 23 and 24. It is now well understood that if potential differences are impressed between the electron emitting electrode and the control electrode such as a grid, then the space current is caused to vary greatly with each variation in these potential differences. Therefore it is evident that as oscillator 20 is put into operation, the E. M. F. thereof serves to excite both amplifiers equally, and to cause relatively large alternating currents to flow in coils 28 and 30. However, due to the opposition of these coils as stated heretofore, no E. M. F. is produced in coil 32.

This coil is so connected as to affect by its E. M. F., the recorder 15, through an amplifier 39. This amplifier has an input circuit including coil 32 as well as a grid bias or "C" battery 40. This battery is used to provide such a potential difference between the grid 41 and filament 42 of the amplifier that little space current flows in the tube when coil 32 is inactive. The output circuit of amplifier 39 includes primary 18 and "B" battery 43. Filament 42 is heated by current from "A" battery 44.

As thus far described, it is evident that recorder 15 is inactive unless some disturbance is produced in the balance between the two amplifiers 21 and 22. This disturbance can be caused by the received shocks. For this purpose there is utilized a receiving device 45, such as a piezo crystal device sensitive to mechanical vibration, which causes the generation of potential differences. The device 45 can include one or more thermionic amplifiers, for which battery 46 serves as a filament heating battery; and battery 47 as a "B" battery. The output circuit of device 45 includes the iron cored impedance 48 and the battery 47.

The potential variations in the output circuit caused by the operation of device 45, are caused to affect the input of an amplifier 49. This is done by connecting one terminal of coil 48 to the control electrode of amplifier 49, through a stopping condenser 50; and the negative terminal of battery 47 to the filament 51. The heating current for this filament is secured from battery 52. In order to make amplifier 49 most sensitive to the impulses received, the control electrode is biased as through "C" battery 53 and resistance 54.

The output circuit of tube 49 includes iron cored impedance 55. This output circuit is caused in turn to affect the input of another amplifier 56, the impedance 55 connecting to its control electrode through stopping condenser 57. Filament 58 of this amplifier, being also supplied with heating current from battery 52, is connected to the other terminal of the output circuit, which includes the common "B" battery 47. The control electrode 59 is also biased as through resistance 60.

The output circuit of tube 56 is caused oppositely to affect the amplifiers 21 and 22 of the modulator system already described. For this purpose the output includes the primaries of a pair of transformers 61 and 62. The complete output circuit thus includes the plate of tube 56, primaries of transformers 62 and 61, battery 47, and filament 58. The secondary coils of these transformers connect between the filaments and grids of amplifiers 21 and 22. Thus for amplifier 22, there is a circuit from filament 23, connection 63, an adjustable portion of a resistor 64, secondary 65, and grid 36. For amplifier 22, the corresponding circuit includes filament 24, connection 63, an adjustable portion of resistor 64, secondary coil 66, and grid 37. The adjustable portions of resistor 64 included in both circuits serve to provide an adjustable negative bias to both grids so as to balance both tubes 21 and 22 properly. A battery 67 serves to produce a potential drop in resistance 64 through a potentiometer circuit.

A ground connection 68 serves to ground all of the various elements of the system, through leads 63 and 38. In this way, inductive transfer of energy between the elements is avoided, with its attendant instability.

For clearness, the receiving device 45, with its batteries, and tubes 49 and 56 can be termed the receptor circuit. The tubes 21 and 22, their associated transformers, and oscillator 20 can be termed the modulator circuit; and amplifying tube 39, its associated transformers, and recorder 15 can be termed the recorder circuit.

The grid bias provided by the potentiometer circuit 64—67 is adjusted not only to equalize the effect of the oscillator 20 on both tubes 21 and 22, but also to cause the greatest change in alternating current resistance of their plate circuits upon a small change in grid potential. It is also to be understood that when the potential of grid 37 for example is varied in one direction by the action of tube 56, the potential of grid 36 of the other tube 21 is varied in the opposite direction. This produces the well-known push-pull effect in connection with transformer 31, so that upon a least variation in output current of tube 56, there is a magnified difference in the two output currents of tubes 21 and 22, with an attendant large electromotive force induced in secondary 32 of the push-pull transformer 31.

The summary of the operation can now be set forth. Prior to the arrival of any shocks at the receiving device 45, tubes 21 and 22 are balanced. No currents are recorded by recorder 15. If now a sudden shock occurs in the earth in the neighborhood of device 45, this shock will in a short time arrive at device 45. An electric impulse will then start therefrom; it will be amplified by tubes 49 and 56, and thence delivered to the modulator circuit. Since the impulse at the beginning of a shock such as is caused by an explosion is usually very abrupt, an abrupt change in electric potential will be induced in the secondary windings 65 and 66 of transformers 61 and 62. This will increase the potential of the grid in one of the tubes, say grid 36 of tube 21, while the potential on grid 37 of tube 22 will be lowered. There will then be a change in the output currents of tubes 21 and 22, whereby the primary windings 28 and 30 no longer carry equal currents. Therefore secondary 32 will deliver a current including a frequency equal to the sum of the frequencies of oscillator 20 and of the received shocks.

By proper tuning of the string galvanometer in recorder 15, in accordance with a frequency present in the shocks to be recorded, the sum frequency or any other frequency can be accentuated, and the effects of the other shock frequencies can be reduced. The apparatus as a whole can thus be rendered sensitive to any desired range of vibratory frequencies in the earth. This is especially useful since the explosion of an explosive does not give rise to a pure frequency, but rather to a combined or composite wave consisting of a large number of frequencies. When so adjusted, the apparatus does not give a true picture of what transpired in the earth, but rather it indicates accurately the occurrence and duration of vibrations having the frequency component for which the apparatus is adjusted. The equipment can thus be made extremely sensitive to the abrupt onset of vibrations in the earth, and much less sensitive to the succeeding and somewhat slower vibrations.

I claim:

1. In a system for recording the time of arrival of mechanical vibrations, the process which comprises translating said vibrations into electrical impulses, combining said impulses with other electrical impulses of much higher frequency, and recording the resultant combination.

2. In a system for recording the time of arrival of mechanical vibrations, the process which comprises translating said vibrations into electrical impulses, modulating said impulses with impulses of a much higher frequency, and recording the resultant modulated impulses.

3. In a system for recording the time of arrival of mechanical vibrations, the process which comprises generating electrical impulses of much higher frequency than those of the vibrations, translating the vibrations into electrical impulses, and affecting a recording device with said generated impulses only upon existence of said translated impulses, and in accordance therewith.

4. In a system for recording the time of arrival of mechanical vibrations, said system having an electrical impulse recorder, the process which comprises translating said vibrations into electrical impulses, modulating said impulses with electrical impulses of much higher frequency, and affecting said recorder with the said higher frequency only when said mechanical vibrations exist.

5. In an apparatus for recording mechanical vibrations originating in the earth, a source of vibratory energy, a recorder capable of actuation by said energy, means whereby said energy is incapable of actuating the recorder, and means responsive to mechanical vibrations for rendering said incapacitating means ineffective during the existence of said mechanical vibrations.

6. In an apparatus for recording explosive shocks originating in the earth, a local source of vibratory energy, a recorder capable of being actuated by said vibratory energy, means normally preventing said recorder from actuation by said energy, and means responsive to an earth shock for permitting said energy to actuate the recorder.

7. In combination, means for translating mechanical vibrations into electrical vibrations, and means for recording the time of arrival of said mechanical vibrations, comprising means altering the character of the electrical vibrations in such manner that they can be recorded as connected areas, and a recorder for said altered vibrations.

8. In combination, means for translating mechanical vibrations of low frequencies originating in the earth into electrical vibrations, means for combining said low frequency vibrations with high frequency electrical vibrations whereby modulated vibrations are secured, a recorder, and means whereby said recorder responds only to the modulated vibrations.

9. In combination, a recorder of electrical vibrations, a source of electrical vibrations, a pair of translating devices to which said source connects, said devices being balanced and in opposed relation as regards said source, whereby said source is normally ineffective to actuate the recorder, and means responsive to the arrival of mechanical vibrations from the earth, for upsetting said balance.

10. In combination, a recorder of electrical vibrations, a pair of electronic emission amplifiers, output circuits for said amplifiers, each of said output circuits including a primary winding, the two windings being opposed, a secondary winding for said windings for transmitting impulses to the recorder, a source of vibrations connecting to the input sides of both amplifiers and in such manner that the currents in the output circuits normally neutralize each other, a system for receiving mechanical vibrations of relatively low frequency originating in the earth and for translating them into corresponding electrical vibrations, and means whereby said system oppositely affects the amplifiers to destroy their balance, so that the recorder then receives and records impulses from the source of vibrations.

In testimony whereof I have hereunto set my hand.

FRANK RIEBER.